UNITED STATES PATENT OFFICE.

CHARLES J. REED, OF PHILADELPHIA, PENNSYLVANIA.

PROCESS OF RECOVERING ZINC.

1,069,178.  Specification of Letters Patent.  Patented Aug. 5, 1913.

No Drawing.  Application filed June 3, 1912.  Serial No. 701,299.

*To all whom it may concern:*

Be it known that I, CHARLES J. REED, a citizen of the United States, residing at Philadelphia, in the county of Philadelphia and State of Pennsylvania, have invented certain new and useful Improvements in Processes of Recovering Zinc, of which the following is a specification.

The process is directed to the recovery of zinc from ores, flue dust, chimney fume, etc. If the material contains sulfids, I prefer as a preliminary operation to roast it at a low temperature, to convert the sulfids into oxids, sulfates and sulfites. This mixture, in a finely pulverized condition, or the original material if it comprises only oxids, sulfates, sulfites and carbonates, is treated with sulfuric acid of proper strength, either directly or after a preliminary washing with water to remove the soluble sulfates. I may use acid of any suitable strength, as for example that having a specific gravity of 1.25. I first ascertain the percentage of zinc contained in the material, and use a quantity of acid either equal to or somewhat in excess of the amount theoretically required to dissolve the zinc present. If copper and silver are present, I use an excess of acid above the amount required to dissolve these metals also. If iron in a ferrous condition is also present, enough acid may be used to dissolve some iron also. I find it advantageous to use heat and agitation in order to effect a complete or nearly complete solution of the zinc, though I conceive that it might be accomplished without heat or agitation. When iron in the ferrous condition is present, I prefer to convert it into the ferric state by adding a small quantity of nitric acid, lead peroxid, sodium permanganate, air, or other oxidizing agent which will not interfere with the subsequent operations. The resulting solution containing sulfates of zinc, whatever copper, silver and cadmium may be present, and some iron, is then removed from the insoluble residue, as by filtration or decantation. If necessary, the solution is then again treated with an oxidizing agent such as specified, in order to insure the conversion of all iron into the ferric state. The oxidized solution is then digested with oxid, carbonate or other compound of zinc capable of precipitating the copper, silver and iron, using enough of the zinc-containing substance so that some excess remains undissolved; the resulting solution is neutral and pure enough for most commercial purposes, and the zinc may be recovered from it, either in the metallic state by electrolysis, or as crystallized zinc sulfate by evaporation. If, however, a purer quality of zinc is required, the solution is agitated with finely-divided metallic zinc, preferably with the aid of heat. This removes all silver, copper, cobalt, nickel, arsenic, antimony, bismuth, and other metals that would interfere with the electrolytic deposition of pure zinc. The electrolysis of this solution separates zinc at the cathode, and either liberates free sulfuric acid at the anode, or causes it to enter into some other chemical combination. I prefer to use an anode of finely-divided metallic lead, which binds the electrochemically liberated sulfuric acid as lead sulfate, thereby electrochemically maintaining the solution neutral.

The expression "zinc-containing substance", as used in the claims, includes either metallic zinc, or any compound of zinc capable of removing objectionable impurities.

I claim:

1. The process of recovering zinc, which consists in treating material containing zinc with an excess of sulfuric acid, treating the resulting solution with an oxidizing agent, purifying the oxidized solution with an excess of a zinc-containing substance, further purifying the solution, and recovering the zinc from the purified solution.

2. The process of recovering zinc, which consists in treating material containing zinc with sulfuric acid, treating the resulting solution with an oxidizing agent, purifying the oxidized solution with an excess of a zinc-containing substance, further purifying the solution with metallic zinc, and finally recovering the zinc from the purified solution.

In testimony whereof I affix my signature in presence of two witnesses.

CHARLES J. REED.

Witnesses:
 FRANK A. LEACH,
 J. M. JACKSON.